DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

Published March 16, 1971

884 O.G. 733

T884,014
FLAME RESISTANT CARPET

Clarence C. Dannnelly, % Tennessee Eastman Co., Box 511, Kingsport, Tenn. 37662

Filed May 18, 1970, Ser. No. 38,501
Int. Cl. C09k *3/28*
U.S. Cl. 117—137
No Drawing. 22 Pages Specification

A flame resistant carpet fabric comprising in combination a woven backing, a polyester fiber tufted into the woven backing, and a coating securing the polyester fiber into the woven backing. The coating can comprise a polymeric material and a material selected from the group consisting of a flame resisting agent, a filler, a pigment, and mixtures thereof. In this embodiment the flame resisting agent can contain halogen, phosphorus or halogen and phosphorus.

A flame resistant carpet fabric comprising in combination a woven backing, a polyester fiber tufted into the woven backing, and a coating securing the polyester fiber into the woven backing. The coating can comprise a halogen containing polymeric material. In this embodiment the coating can further comprise a material selected from the group consisting of a flame resisting agent, a filler, a pigment and mixtures thereof; and the flame resistant agent can contain halogen, phosphorus or halogen and phosphorus. In one embodiment the coating can comprise an aqueous dispersion containing, based on the weight of the dispersion, about 50 weight percent of a copolymer of vinyl chloride and vinylidene chloride, 25 weight parts tris(2,3-dibromopropyl) phosphate, and 5 weight parts 2-ethylhexyldiphenyl phosphate.